(12) United States Patent
Hatta

(10) Patent No.: US 11,440,275 B2
(45) Date of Patent: Sep. 13, 2022

(54) METHOD FOR MANUFACTURING FIBER REINFORCED RESIN MOLDED ARTICLE, AND MANUFACTURING DEVICE THEREOF

(71) Applicant: TOYOTA JIDOSHA KABUSHIKI KAISHA, Toyota (JP)

(72) Inventor: Ken Hatta, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/159,259

(22) Filed: Jan. 27, 2021

(65) Prior Publication Data
US 2021/0299982 A1     Sep. 30, 2021

(30) Foreign Application Priority Data
Mar. 25, 2020    (JP) .............................. JP2020-054082

(51) Int. Cl.
| | |
|---|---|
| *B29C 45/38* | (2006.01) |
| *B29C 70/54* | (2006.01) |
| *B29C 70/48* | (2006.01) |
| *B29C 70/46* | (2006.01) |
| B29K 307/04 | (2006.01) |
| B29L 31/00 | (2006.01) |

(Continued)

(52) U.S. Cl.
CPC ............ *B29C 70/545* (2013.01); *B29C 45/38* (2013.01); *B29C 70/462* (2013.01); *B29C 70/48* (2013.01); *B29C 45/14786* (2013.01); *B29C 2045/384* (2013.01); *B29C 2793/009* (2013.01); *B29C 2793/0027* (2013.01); *B29K 2063/00* (2013.01); *B29K 2307/04* (2013.01); *B29L 2031/7156* (2013.01)

(58) Field of Classification Search
CPC ....... B29C 70/443; B29C 70/48; B29C 45/38; B29C 2045/384
USPC .................................................. 425/553, 554
See application file for complete search history.

(56) References Cited

U.S. PATENT DOCUMENTS

| | | | |
|---|---|---|---|
| 4,681,718 A * | 7/1987 | Oldham .............. | B29C 35/0222 |
| | | | 264/331.12 |
| 2010/0047500 A1* | 2/2010 | Arai ...................... | B29C 45/561 |
| | | | 264/334 |
| 2010/0072680 A1 | 3/2010 | Fries | |

(Continued)

FOREIGN PATENT DOCUMENTS

| | | |
|---|---|---|
| DE | 10 2007 001 756 A1 | 7/2008 |
| DE | 10 2018 122 957 A1 | 3/2019 |

(Continued)

*Primary Examiner* — Scott W Dodds
(74) *Attorney, Agent, or Firm* — Finnegan, Henderson, Farabow, Garrett & Dunner, LLP

(57) ABSTRACT

Provided is a method for manufacturing a fiber reinforced resin molded article capable of effectively increasing the strength of a fiber reinforced resin molded article, such as a high-pressure tank, and such a manufacturing device thereof. With use of a cutting core that is heated to a higher temperature than a mold, the curing of a portion of resin (thermosetting resin) to be cut in a runner is facilitated, and the portion of the resin to be cut in the runner is cut by the cutting core. The heating temperature of the cutting core is higher than the temperature of the mold and lower than the heating temperature in an aftercure step performed after removing the high-pressure tank from the mold.

5 Claims, 11 Drawing Sheets

(51) Int. Cl.
*B29K 63/00* (2006.01)
*B29C 45/14* (2006.01)

(56) References Cited

U.S. PATENT DOCUMENTS

2013/0134626 A1* 5/2013 Molinari ................ A63B 45/00
              425/170
2019/0084249 A1* 3/2019 Hatta ...................... B29C 70/48

FOREIGN PATENT DOCUMENTS

| JP | 56148533 A | * 11/1981 | ............. B29C 45/38 |
| JP | 2019-056415 A | 4/2019 | |
| JP | 2019-081310 A | 5/2019 | |

* cited by examiner

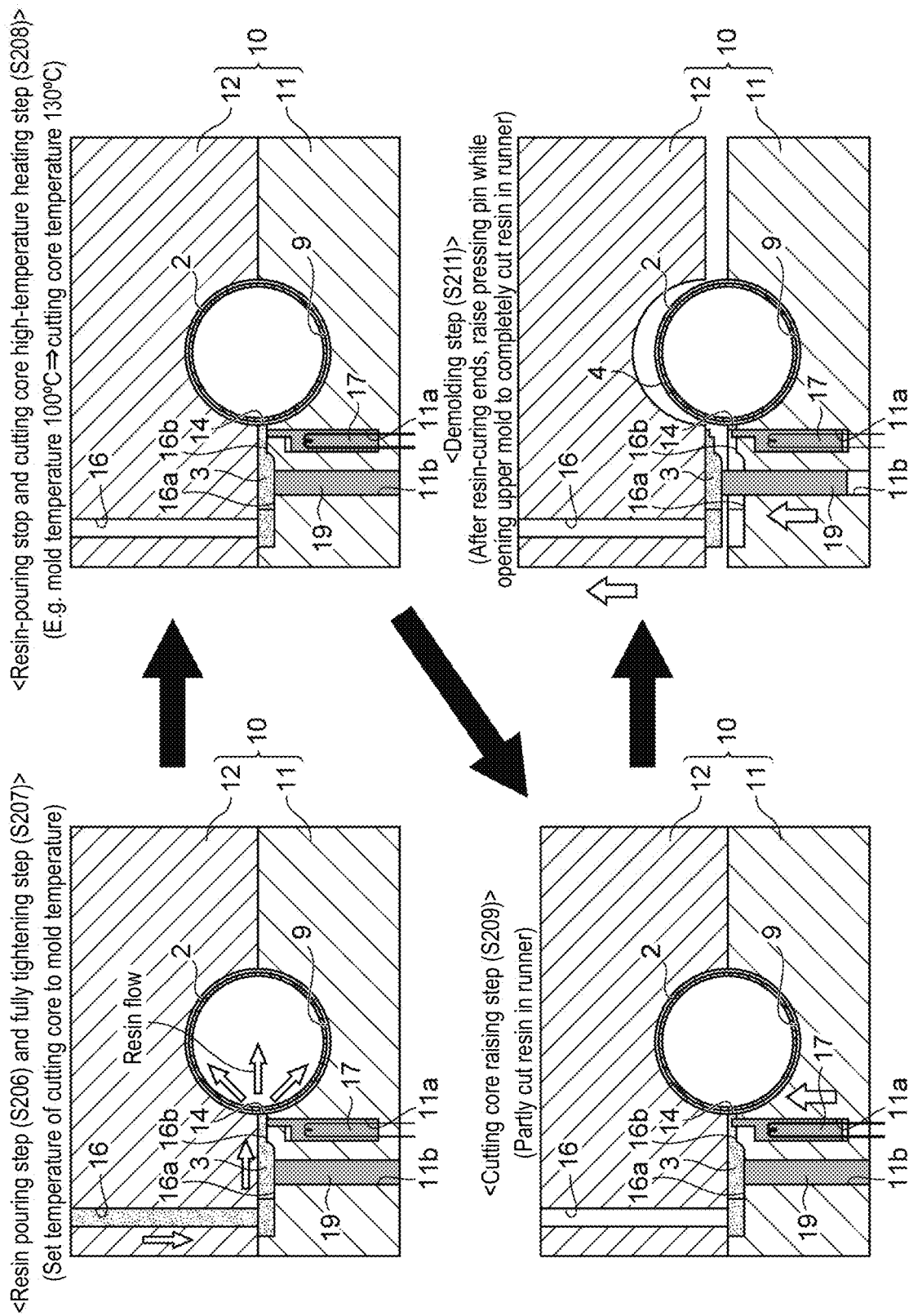

METHOD FOR MANUFACTURING FIBER REINFORCED RESIN MOLDED ARTICLE, AND MANUFACTURING DEVICE THEREOF

CROSS REFERENCE TO RELATED APPLICATIONS

The present application claims priority from Japanese patent application JP 2020-054082 filed on Mar. 25, 2020, the entire content of which is hereby incorporated by reference into this application.

BACKGROUND

Technical Field

The present disclosure relates to methods for manufacturing fiber reinforced resin molded articles, such as a high-pressure tank that is reinforced with fibers, and manufacturing devices thereof.

Background Art

Fuel cell vehicles include a high-pressure tank (hereinafter, simply may be called a tank) that stores fuel gas such as natural gas or hydrogen gas. Such a high-pressure tank is prepared as a fiber reinforced resin molded article that includes a hollow liner having a gas barrier property as a core member, and carbon fiber reinforced plastic or glass fiber reinforced plastic (hereinafter collectively called a fiber reinforced resin layer) that coats the liner. For lightweight, a hollow container made of resin is typically used as the liner.

High-pressure tanks have been conventionally manufactured by the filament winding (FW) method and the resin transfer molding (RTM) method. JP 2019-056415 A, for example, discloses a method for manufacturing a high-pressure tank by the RTM method. This manufacturing method places a preform in a mold, the preform including a liner defining the inner space of the high-pressure tank and a fiber layer formed on the outer surface of the liner, and rotates the preform in the mold in the circumferential direction about the central axis of the preform while injecting resin from a gate toward the preform placed in the mold.

SUMMARY

Such a method for manufacturing a high-pressure tank needs to cut the gate after the resin impregnated into the high-pressure tank (or the fiber layer thereof) is cured in the mold to get rid of the redundant resin (see, for example, JP 2019-081310 A). The current method firstly removes the molded high-pressure tank from the mold, and then cuts the gate by a laser or a water jet. In such a method, however, foreign matter, such as a burnt resin generated by the laser or a water content generated by the water jet, may enter into the high-pressure tank, leading to the deterioration of the strength of the high-pressure tank. In addition, the postprocessing by the laser or the water jet may require capital investment and time, resulting in an increase in costs. At the same time, variation in the processing time depending on the high-pressure tank may lead to variation in the cured state of the high-pressure tank, leading to variations in the tank performance.

In view of the above problems, the present disclosure provides a method for manufacturing a fiber reinforced resin molded article capable of effectively increasing the strength of a fiber reinforced resin molded article, such as a high-pressure tank, and such a manufacturing device thereof.

According to one aspect of the present disclosure, there is disclosed a method for manufacturing a fiber reinforced resin molded article to form a preform including a fiber layer on an outer surface of a liner, impregnate the fiber layer of the preform with resin, and cure the resin, and the method includes: a step of preparing a mold having a runner for pouring resin into a cavity, the resin including a thermosetting resin, and having a cutting core disposed therein, the cutting core being movable relative to the runner to cut the resin in the runner; a step of placing the preform in the cavity; a step of pouring resin into the cavity through the runner; a step of stopping pouring of the resin into the cavity to cure the resin, and heating the cutting core to a higher temperature than the mold; a step of cutting the resin in the runner by moving the cutting core relative to the runner when a viscosity of a portion of the resin in the runner in a position of the cutting core is within a predetermined range; and a step of demolding the preform while opening the mold after the curing of the resin impregnated into the preform ends.

In some embodiments, at a timing set beforehand from a relation between a curing time and a viscosity of the resin, it is determined that the viscosity of the portion of the resin in the runner in the position of the cutting core is within a predetermined range.

In some embodiments, in the step of cutting the resin in the runner, part of the resin in the runner is cut by the cutting core; and in the step of demolding the preform, when opening the mold, a shear is produced between a portion of the resin in the runner close to the cavity with respect to the cutting core and a portion of the resin in the runner opposite to the cavity with respect to the cutting core, and a remaining part of the resin in the runner is cut.

In some embodiments, the method includes, after the step of demolding the preform, an aftercure step in which the preform is heated at a higher temperature than a temperature of the mold.

In some embodiments, a heating temperature of the cutting core is higher than the temperature of the mold and lower than a heating temperature in the aftercure step.

In some embodiments, the mold includes a first mold and a second mold; and in the step of placing the preform in the cavity, the preform is placed between the first mold and the second mold so as to define a first gap between the first mold and the preform and a second gap between the second mold and the preform, the second gap being larger than the first gap, the method further including in the step of pouring resin into the cavity through the runner, a step of bringing the second mold close to the preform for compressive filling with the resin in the cavity.

According to another aspect of the present disclosure, there is disclosed a device for manufacturing a fiber reinforced resin molded article to form a preform including a fiber layer on an outer surface of a liner, impregnate the fiber layer of the preform with resin, and cure the resin, and the device includes: a mold having a runner for pouring resin into a cavity, the resin including a thermosetting resin, and having a cutting core disposed therein, the cutting core being movable relative to the runner to cut the resin in the runner; a heating mechanism configured to heat the cutting core; a cutting core driving mechanism configured to drive the cutting core; a mold driving mechanism configured to drive the mold in a direction to open and close the mold; a resin pouring mechanism configured to pour resin into the cavity through the runner; and a control device configured to control operating states of the heating mechanism, the cutting core driving mechanism, the mold driving mechanism, and the resin pouring mechanism, the control device being configured to control the mold driving mechanism to place the preform in the cavity; control the resin pouring mechanism to pour resin into the cavity through the runner; control the resin pouring mechanism to stop pouring of the resin into the cavity to cure the resin, and control the heating mechanism to heat the cutting core to a higher temperature than the mold; control the cutting core driving mechanism to cut the resin in the runner by moving the cutting core relative to the runner when a viscosity of a portion of the resin in the runner in a position of the cutting core is within a predetermined range; and control the mold driving mechanism to demold the preform while opening the mold after the curing of the resin impregnated into the preform ends.

In some embodiments, at a timing set beforehand from a relation between a curing time and a viscosity of the resin, the control device determines that the viscosity of the portion of the resin in the runner in the position of the cutting core is within a predetermined range.

In some embodiments, the mold includes a first mold and a second mold and has a pressing member, the pressing member forming part of the runner in a position in the runner opposite to the cavity with respect to the position of the cutting core and being integrally movable with the second mold and movable relative to the first mold, and the control device is configured to control the cutting core driving mechanism to move the cutting core relative to the runner to cut part of the resin in the runner; and when opening the mold, control the mold driving mechanism to sandwich, between the second mold and the pressing member, a portion of the resin in the runner opposite to the cavity with respect to the cutting core to produce a shear between a portion of the resin in the runner close to the cavity with respect to the cutting core and a portion of the resin in the runner opposite to the cavity with respect to the cutting core, and to cut a remaining part of the resin in the runner.

In some embodiments, the device further includes a curing furnace to perform an aftercure step in which the preform is heated at a higher temperature than the temperature of the mold after demolding the preform.

In some embodiments, a heating temperature of the cutting core is higher than a temperature of the mold and lower than a heating temperature in the aftercure step.

In some embodiments, the mold includes a first mold and a second mold; and the control device is configured to control the mold driving mechanism to place the preform between the first mold and the second mold so as to define a first gap between the first mold and the preform and a second gap between the second mold and the preform, the second gap being larger than the first gap; control the resin pouring mechanism to pour resin into the cavity through the runner; and control the mold driving mechanism to bring the second mold close to the preform for compressive filling with the resin in the cavity.

According to one aspect of the present disclosure, with use of the cutting core that is heated to a higher temperature than the mold, the curing of the portion of the resin to be cut is facilitated, and the portion of the resin to be cut is cut by the cutting core. This configuration can perform gate cut without producing foreign matter and also make the resin stably cured, thus increasing the strength of the fiber reinforced resin molded article, such as a high-pressure tank.

In addition, the aftercure step can increase the strength of the fiber reinforced resin molded article such as a high-pressure tank, and the performing of the gate cut in the mold can suppress the temperature change in the product before the aftercure, thus effectively increasing the strength and quality of the fiber reinforced resin molded article such as a high-pressure tank.

Furthermore, by setting the temperature of the cutting core within a predetermined range, it is possible to obtain an excellent cutting surface in the portion of the resin to be cut, thus effectively increasing the strength of the fiber reinforced resin molded article such as a high-pressure tank.

BRIEF DESCRIPTION OF THE DRAWINGS

FIG. 11 is an enlarged vertical cross-sectional view of a main part for explaining a cutting configuration example of resin in a runner.

DETAILED DESCRIPTION

Figure 1:
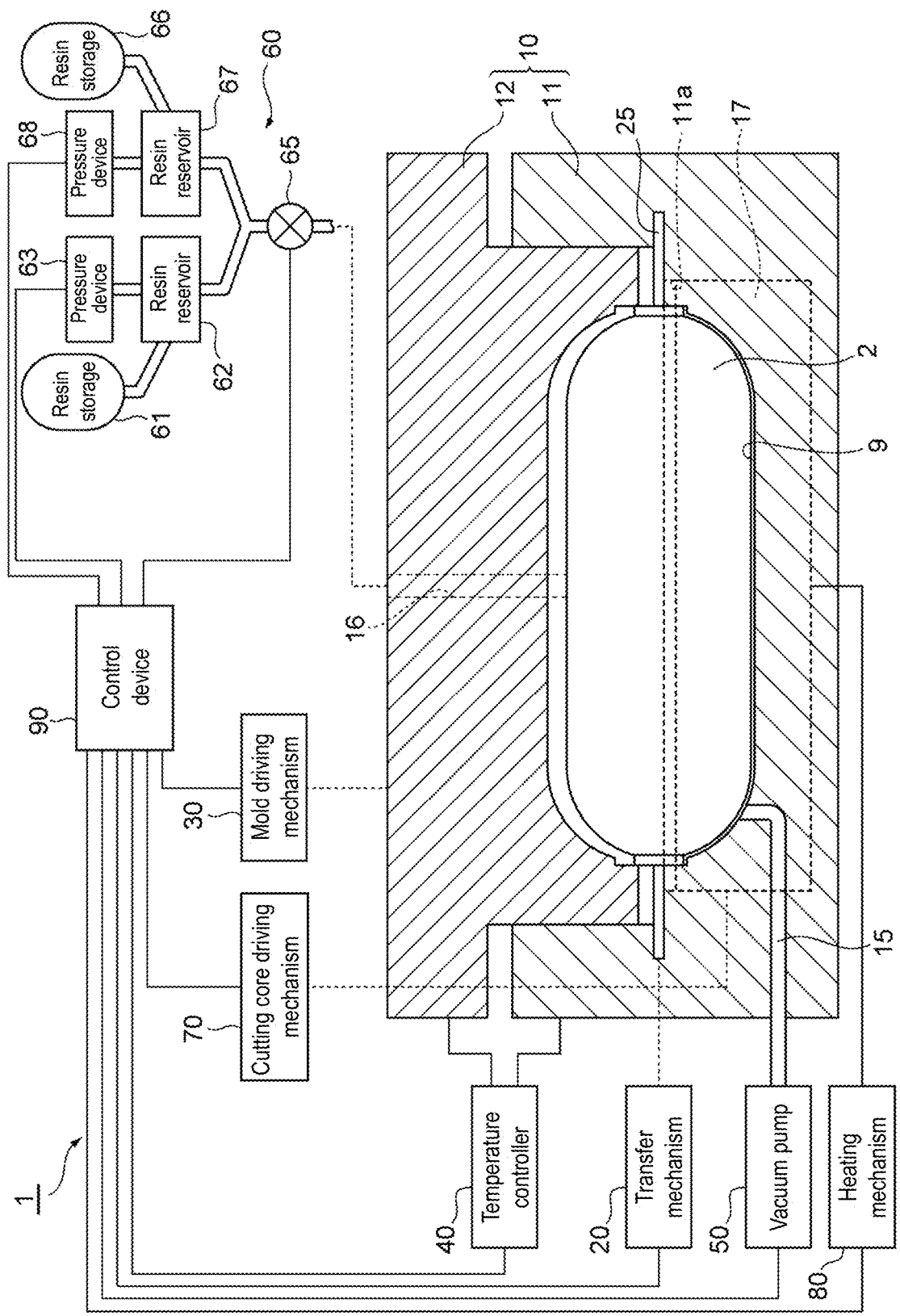
FIG. 1 is a vertical cross-sectional view of a manufacturing device of a high-pressure tank (fiber reinforced resin molded article) according to an embodiment.

The following describes an embodiment of the present disclosure, with reference to the attached drawings.

The following describes a high-pressure tank for fuel cell vehicles that is one example of a fiber reinforced resin molded article. The fiber reinforced resin molded article, to which the present disclosure is applied, is not limited to the high-pressure tank for fuel cell vehicles. The shape, the material, etc. of the liner and the preform of the fiber reinforced resin molded article are also not limited to the illustrated example.

The RTM method wraps (winds) carbon fiber around a liner multiple times (in multiple layers) to form a preform with a fiber layer on the outer surface of the liner, impregnates the fiber layer of the preform with epoxy resin, and cures the epoxy resin. In this way the RTM method manufactures a high-pressure tank for fuel cell vehicles including a fiber reinforced resin layer including the carbon fiber and the epoxy resin on the outer periphery of the liner. The liner is a hollow container made of resin (for example, nylon resin) that defines the inner space of the high-pressure tank.

In such a high-pressure tank for fuel cell vehicles, the carbon fiber is laminated thickly, and so the resin hardly enters into the inner layer of the carbon fiber and the resin flow end portion (i.e., a portion having resin flow last on the preform, that is, a portion where resin reaches at the latest time on the preform). That is, the high-pressure tank for fuel cell vehicles has the carbon fiber that is laminated very thickly (about 10 times that of a typical RTM molded body component) to keep enough strength, and it is difficult to impregnate the fiber with resin. Furthermore, raising the mold temperature up to the resin curing-start temperature to shorten the curing time of the resin may significantly increase viscosity, and this makes it difficult to impregnate the resin flow end portion of the high-pressure tank of a large cylindrical shape with resin. Meanwhile, lowering the mold temperature to increase resin impregnation with a reduced viscosity may extend the curing time of the resin and reduce intermolecular bonds in epoxy resin. This may lead to the deterioration of the tank performance.

In view of the above, when a low mold temperature that allows demolding in the RTM mold is set for the RTM molding, it is needed to perform aftercure at a high temperature to ensure physical properties. However, if the time and tank temperature change between the RTM molding and the aftercure, the tank quality and the tank performance may deteriorate. For example, when the portions other than the tank product such as a runner, a gate, etc. are processed after the RTM molding, the post-processing may require capital investment and time, leading to an increase in costs. At the same time, if the processing time varies depending on the tank and the tank temperature decreases or changes, the cured state of the tank may vary and the variations in the tank performance may occur, leading to critical quality problems.

To avoid this, the present embodiment has the following configuration.

[Manufacturing Device of High-Pressure Tank]

Figure 2:
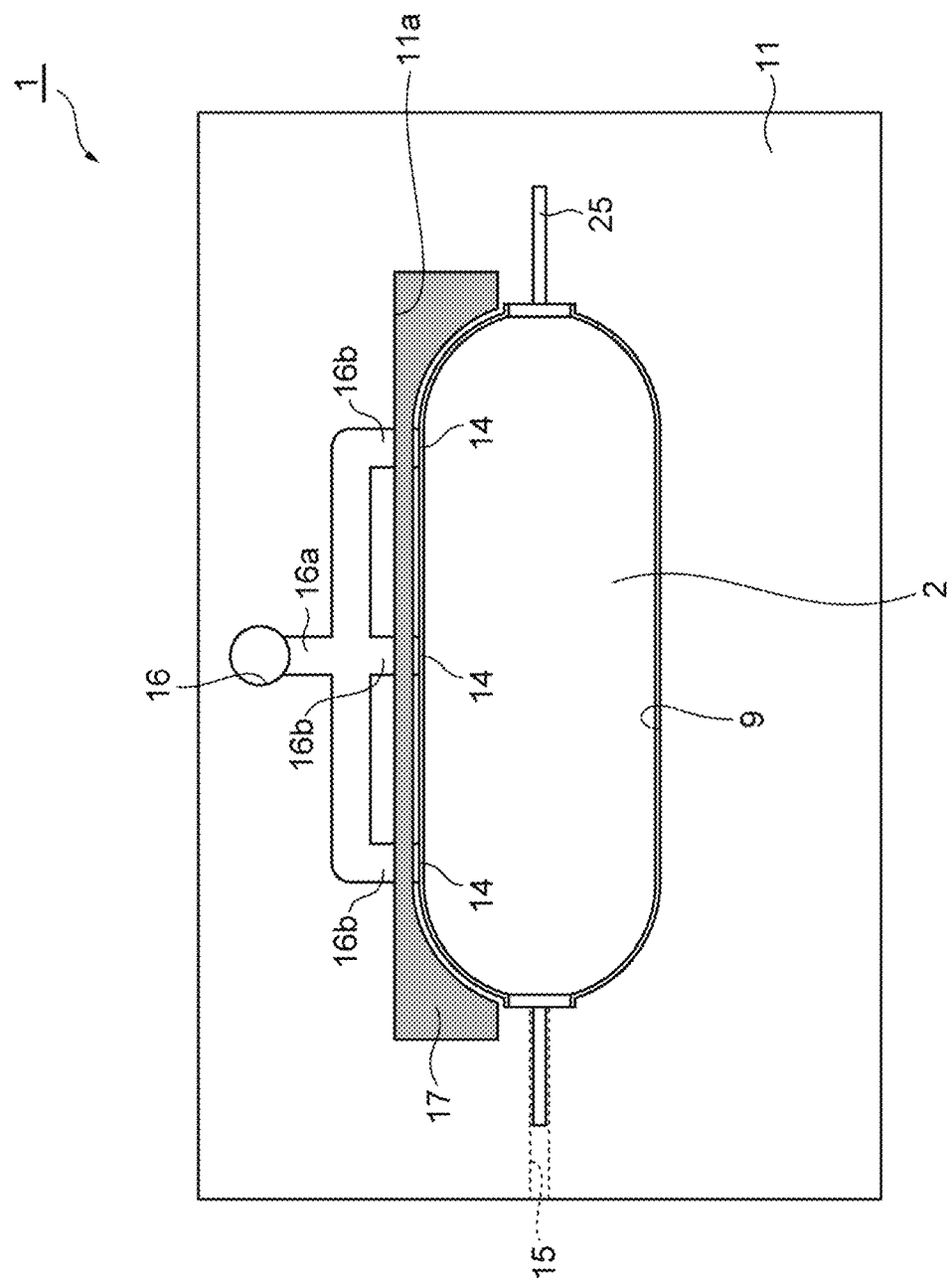
FIG. 2 is a top view of a lower mold of the manufacturing device of a high-pressure tank (fiber reinforced resin molded article), in which an upper mold is removed, according to the embodiment.

FIG. 1 and FIG. 2 show a manufacturing device of a high-pressure tank that is one example of a fiber reinforced resin molded article according to an embodiment. FIG. 1 is a vertical cross-sectional view and FIG. 2 is a top view of a lower mold in which an upper mold is removed.

A preform 2 as an intermediate body of the high-pressure tank to be manufactured in the present embodiment includes a liner and a fiber layer formed on the outer surface of the liner to be integrated with the liner. The liner is a resin hollow container having a gas barrier property and defining an inner space of the high-pressure tank. In one example, the fiber layer has a thickness of about 10 mm to 30 mm. The fiber layer is formed by wrapping fibers around the outer surface of the liner multiple times by the filament winding method.

Examples of the fiber wound around the liner include carbon fiber, glass fiber, and aramid fiber. The fibers may include continuous fibers, or include long fibers or short fibers. As described later, the fiber (layer) wound around the liner is impregnated with resin and cured to form a fiber reinforced resin layer that coats the periphery of the liner. Examples of the resin include thermosetting resins, such as epoxy resins, unsaturated polyester resins, and polyamide resins.

Figure 5:
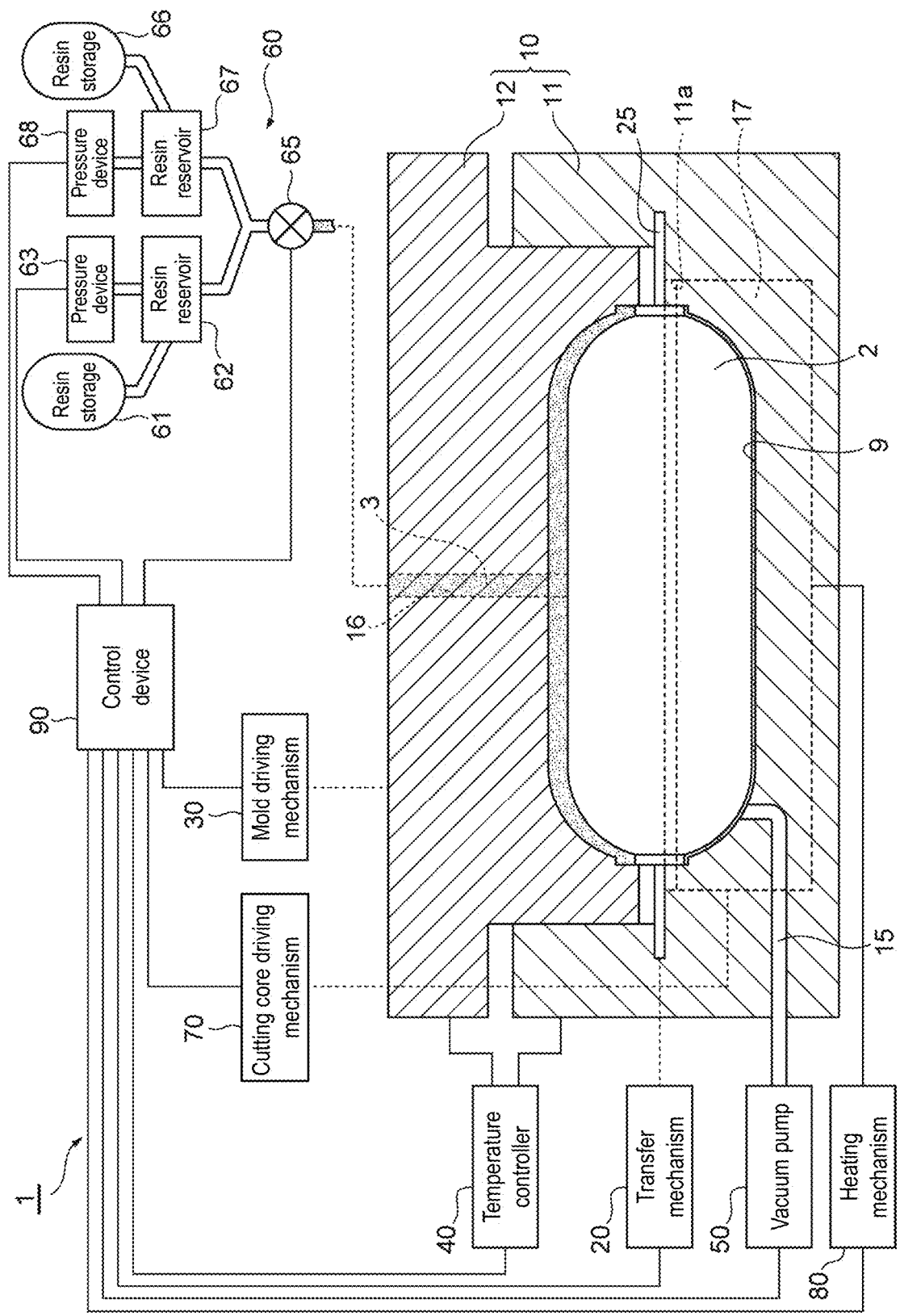
FIG. 5 is a vertical cross-sectional view of the manufacturing device of a high-pressure tank, showing a resin pouring step according to the embodiment.

The manufacturing device 1 is configured to manufacture a high-pressure tank by the RTM method to impregnate the fiber layer making up the preform 2 with resin (thermosetting resin) 3 (reference numeral is shown in FIG. 5, for example) and cure the impregnated resin 3.

In one example, the manufacturing device 1 includes a mold 10 made up of a plurality of molds, such as a lower mold 11 as a fixed mold and an upper mold 12 as a moving mold. Closing of these lower mold 11 and upper mold 12 (this may be called mold clamping) defines a cavity 9 for the fiber reinforced resin layer. To place the preform 2 having the lamination of fiber in the mold 10, the cavity 9 of the mold 10 is made larger by the tolerance of the preform 2, for example.

This embodiment includes the lower mold 11 as a fixed mold and the upper mold 12 as a moving mold (a mold that is movable relative to the fixed mold). In another embodiment, the upper mold 12 may be a fixed mold and the lower mold 11 may be a moving mold, or both of the lower mold 11 and the upper mold 12 may be movable. The mold 10 in this embodiment includes two parts of the lower mold 11 and the upper mold 12, which may be three or more of parts.

In the mold 10, the preform 2 is supported by a shaft 25 that is disposed along the axis of the liner. That is, the shaft 25 constitutes a support mechanism that supports the preform 2 in the mold 10 (in the cavity 9).

A vacuum degassing pipe 15 is embedded in the mold 10 (in the lower mold 11 in the illustrated example). The vacuum degassing pipe 15 connects to a vacuum pump 50. The vacuum pump 50 operates to degas (evacuate) the mold 10 (the cavity 9) via the vacuum degassing pipe 15. That is, the vacuum pump 50 and the vacuum degassing pipe 15 constitute a vacuum degassing mechanism for vacuum degas of the mold 10 (the cavity 9).

A resin pouring pipe (this may be called a resin pouring gate) 16 is embedded in the mold 10. The resin pouring pipe 16 connects to a resin injector 60. The resin injector 60 pours (supplies) resin 3 into the mold 10 (cavity 9) (via three gates 14, which will be described later) through the resin pouring pipe 16 (described in detail later). In one example, the resin 3 is a two-component thermosetting epoxy resin composed of a base resin and a curing agent. The resin injector 60 therefore includes a resin storage 61, a resin reservoir 62, and a pressure device 63 for the base resin, a resin storage 66, a resin reservoir 67, and a pressure device 68 for the curing agent, and a valve 65 to supply the resin 3, which is a mixture of the base resin and the curing agent, to the resin pouring pipe 16.

In this example, the resin pouring pipe 16 extends from the upper mold 12 toward the lower mold 11. As shown in FIG. 2, the lower mold 11 is provided with a main runner 16a, which extends to the cavity 9 so as to be continuous to the resin pouring pipe 16, and a plurality of runners 16b, which branches off from the main runner 16a to form gates (resin inlets) 14 that are open to the cavity 9. In this example, three gates 14 are provided. The gate 14 at the center is located at the position facing the central portion (in the axial direction) of the preform 2, and the gates 14 at the opposite ends are located at the positions facing the opposite end portions (in the axial direction) of the preform 2. It should be noted that the number or size of the runners 16b that branch off from the main runner 16a, the opening position or size of the gates 14, and the like are not limited to the illustrated example.

The resin 3 flowing through the resin pouring pipe 16 flows from the main runner 16a to the three runners 16b. This allows the resin injector 60 to pour (supply) the resin 3 through the resin pouring pipe 16, the main runner 16a, and the runners 16b into the mold 10 (into the cavity 9) from the (three) gates 14. That is, the resin injector 60, the resin pouring pipe 16, the main runner 16a, and the runners 16b constitute a resin pouring mechanism for pouring the resin 3 into the mold 10 (into the cavity 9).

In the mold 10, a cutting core 17 as a movable core that vertically moves relative to the runners 16b is disposed to cut (this may be called gate cut) the resin 3 after flowing through the runners 16b and being cured with a predetermined viscosity. In this example, the cutting core 17 having a cutting edge for cutting the resin 3 in the runners 16b is housed in a fitting groove 11a in a vertically slidable manner, which vertically extends near the cavity 9 in the lower mold 11, that is, in the vicinity of the gates 14. In the present embodiment, the cutting core 17 is configured to be heated to a predetermined temperature by a heating mechanism 80 (described later).

Now a configuration example for (completely) cutting the resin 3 in the runners 16b will be described with reference to FIG. 11.

As shown in the enlarged view of the cross section of the main part of FIG. 11, in addition to the fitting groove 11a and the cutting core 17, for example, the lower mold 11 is provided with an insertion hole 11b extending downward from the runner 16b between the cutting core 17 and the resin pouring pipe 16, that is, extending downward from the upstream portion of the runner 16b relative to the position of the cutting core 17. A pressing pin 19 as a pressing member is arranged into the insertion hole 11b in a vertically slidable manner. The pressing pin 19 has an end surface (upper end surface) that forms part of the runner 16b, and is configured to move together with the upper mold 12 (integrally with the upper mold 12) and be vertically movable relative to the lower mold 11. It should be noted that although the end surfaces (upper end surfaces) of the cutting core 17 and the pressing pin 19 are flush with the bottom surface of the runner 16b in the example shown in FIG. 11, they do not need to be flush with the bottom surface of the runner 16b.

The entire manufacturing flow will be described later. The cutting of the resin 3 in the runners 16b is performed as follows. First, the (uncured) resin 3 that has flown through the resin pouring pipe 16 is injected/poured through the main runner 16a and the runners 16b into the cavity 9 from the gates 14 (i.e., the resin pouring step: S206, and the fully tightening step: S207, which will be described later). At this time, the end surface (upper end surface) of the pressing pin 19 forms part of the runners 16b, and the temperature of the cutting core 17 is retained at the mold temperature.

After the resin-pouring into the cavity 9 stops, the resin 3 is cured, and the heating mechanism 80 heats the cutting core 17 at a high temperature (i.e., the resin-pouring stop and cutting core high-temperature heating step: S208, which will be described later). At this time, the cutting core 17 is heated to a higher temperature (about 130° C.) than the temperature of the mold 10 from the temperature of the mold 10 (about 100° C.).

After a lapse of a predetermined time (at a timing when the portion of the resin 3 in the position of the cutting core 17 comes to a semi-cured state), the cutting core 17 is raised (relative to the runners 16b) to cut the portion of the resin 3 in the runners 16b in the position of the cutting core 17 with the cutting edge of the cutting core 17 (i.e., the cutting core raising step: S209, which will be described later). At this time, the cutting core 17 is raised to the position where the cutting edge of the cutting core 17 does not contact the upper mold 12 (or the lower surface thereof) to avoid damage and secure the durability of the mold 10 (the upper mold 12) and the cutting edge of the cutting core 17. As a result, the portion of the resin 3 in the runners 16b in the position of the cutting core 17 is cut so as to leave the upper part thereof. In other words, the resin 3 in the runners 16b is not completely cut off yet at this stage.

After the resin-curing in the cavity 9 ends, the mold 10 (the upper mold 12) is opened and the high-pressure tank is removed (i.e., the demolding step: S211, which will be described later). At this time, when the upper mold 12 is raised with respect to the lower mold 11, the pressing pin 19 arranged into the lower mold 11 is raised together with the upper mold 12 (integrally with the upper mold 12). As a result, the upstream portion of the resin 3 in the runners 16b relative to the cutting core 17 (the portion opposite to the cavity 9 with respect to the cutting core 17) is raised together with the upper mold 12 and the pressing pin 19 while it is sandwiched between the upper mold 12 (or the lower surface thereof) and the pressing pin 19 (or the upper end surface thereof). Meanwhile, the downstream portion of the resin 3 in the runners 16b relative to the cutting core 17 (the portion close to the cavity 9 with respect to the cutting core 17) remains left on the lower mold 11 together with the molded high-pressure tank. This produces a (vertical) shear between the downstream portion and the upstream portion of the resin 3 in the runners 16b relative to the cutting core 17, and the shear cuts the upper part (remaining part) of the resin 3, which is left without being cut by the cutting core 17, thereby completely cutting off the resin 3 in the runners 16b in the vicinity of the cutting core 17.

It should be noted that the above-described configuration example for cutting the resin 3 in the runners 16b is one of the examples. It is needless to mention that in another example, the resin 3 in the runners 16b may be completely cut off with the cutting edge of the cutting core 17.

Though not illustrated in the drawings, the manufacturing device 1 of the present embodiment includes a curing furnace to perform an aftercure step, in which the high-pressure tank 4 removed from the mold 10 (that is, the preform 2 after the resin 3 is impregnated and cured) is heated at a higher temperature (for example, about 140° C. to 160° C.) than the temperature of the mold 10 (for example, about 80° C. to 100° C.).

The manufacturing device 1 includes: a transfer mechanism 20 to transfer the preform 2 to a predetermined position; a mold driving mechanism 30 to drive the mold 10 (specifically, the upper mold 12) in the direction to open and close the mold (vertical direction); a temperature controller 40 to control the temperature of the mold 10 (lower mold 11, upper mold 12); a cutting core driving mechanism 70 to drive the cutting core 17 in the direction to cut (vertical direction); the heating mechanism 80 to heat the cutting core 17; and the control device 90 as a controller to control the operating state of the entire manufacturing device 1 (specifically, the operating states of the transfer mechanism 20, the mold driving mechanism 30, the temperature controller 40, the vacuum pump 50 in the vacuum degassing mechanism, and the pressure devices 63 and 68 and the valve 65 of the resin injector 60 in the resin pouring mechanism, the cutting core driving mechanism 70, the heating mechanism 80, etc.).

[Method for Manufacturing a High-Pressure Tank]

Figure 3:
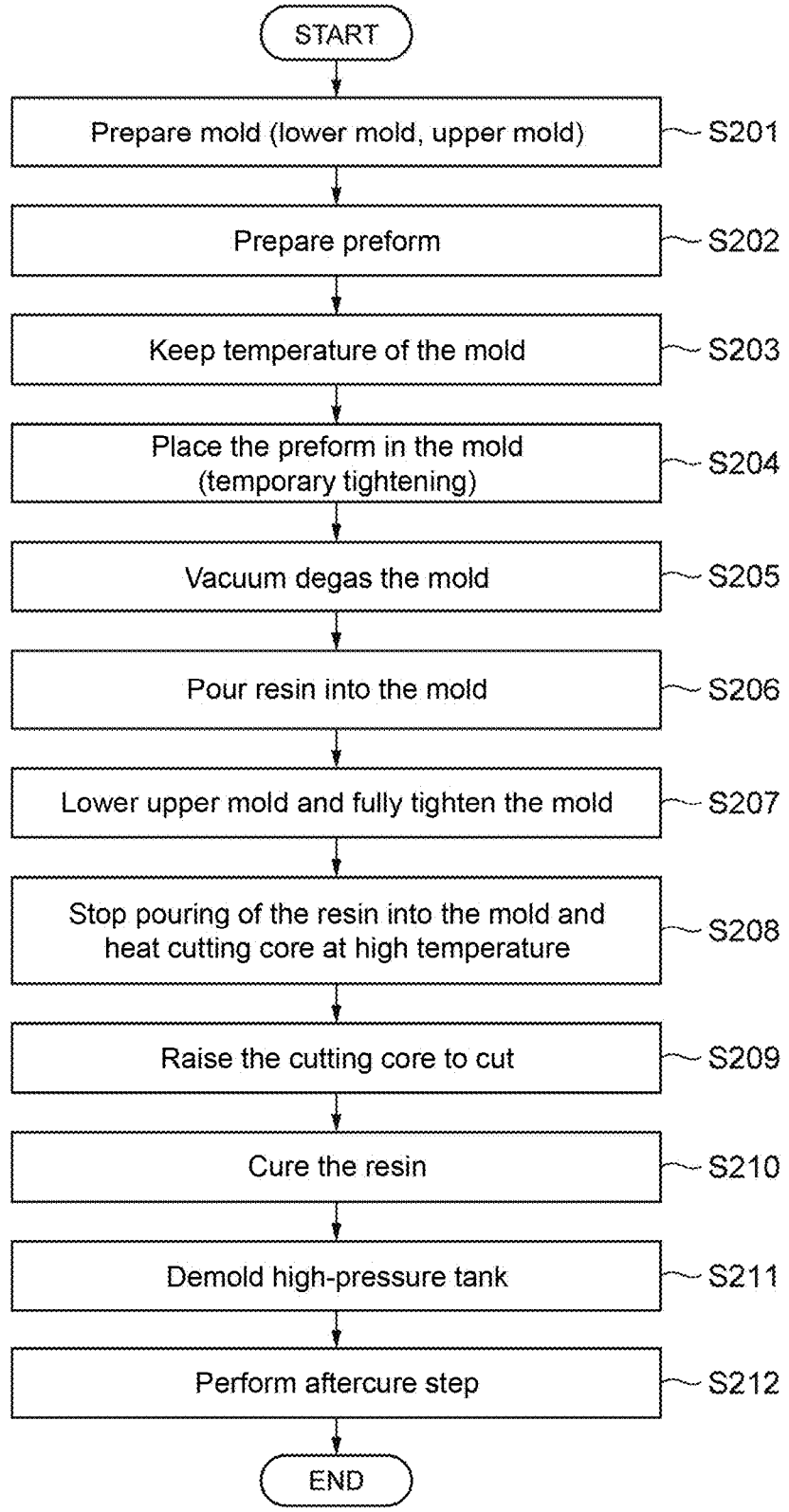
FIG. 3 is a flowchart of a method for manufacturing a high-pressure tank (fiber reinforced resin molded article) according to the embodiment.

FIG. 3 is a flowchart illustrating a method for manufacturing a high-pressure tank that is an example of the fiber reinforced resin molded article according to the embodiment. FIG. 4 to FIG. 9 are vertical cross-sectional views respectively showing a preform placing step and a vacuum degassing step; a resin pouring step; a fully tightening step; a resin-pouring stop and cutting core high-temperature heating step; a cutting core raising step; and a resin curing step. FIG. 10 is a schematic diagram showing the relation between a curing time and a viscosity of resin (epoxy resin), which is referenced in the determination of a semi-cured state.

(Mold Preparation Step: S201)

Firstly, the method prepares the mold 10 including the lower mold 11 and the upper mold 12 having the above-described structure. As described above, the mold 10 (the lower mold 11) includes, for example, the cutting core 17 that can be heated to a predetermined temperature by the heating mechanism 80.

(Preform Preparation Step: S202)

As described above, the method prepares the preform 2 beforehand, in which a fiber layer is formed by wrapping (winding) fiber around the outer surface of the liner.

(Mold Temperature-Retention Step: S203)

Next, the method makes the control device 90 control the temperature controller 40 so as to keep the temperature of the mold 10 (lower mold 11, upper mold 12) to a predetermined temperature. When the resin 3 is a thermosetting resin, this predetermined temperature is equal to or higher than the curing temperature of the resin 3. This predetermined temperature may be set to a low temperature that allows demolding, for example, about 80° C. to 100° C.

The method in this example keeps the temperature of the mold 10 to be the curing temperature of the resin 3 or higher at the beginning. In another example, the temperature of the mold 10 may be kept to be less than the curing temperature of the resin 3 at the beginning, and at an appropriate timing in a step described later (e.g., after fully tightening of the mold 10), the temperature of the mold 10 may be kept to be the curing temperature or higher of the resin 3.

(Preform Placing Step: S204)

Figure 4:
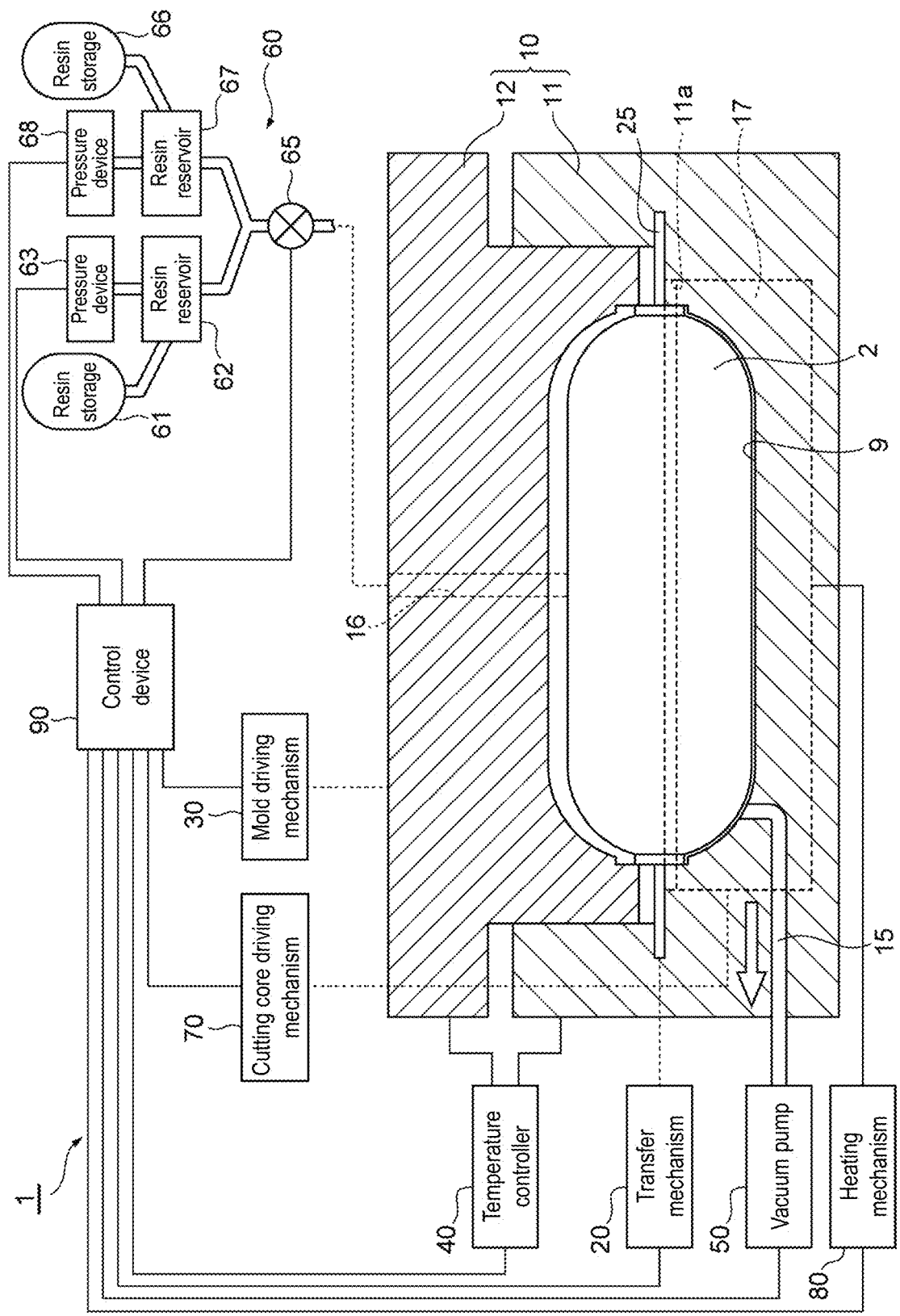
FIG. 4 is a vertical cross-sectional view of the manufacturing device of a high-pressure tank, showing a preform placing step and a vacuum degassing step according to the embodiment.

Subsequently, the control device 90 controls the transfer mechanism 20 and the mold driving mechanism 30 to place the preform 2 in the mold 10 (that is, the cavity 9 formed between the lower mold 11 and the upper mold 12) (FIG. 1, FIG. 4). Specifically, while opening the upper mold 12, the transfer mechanism 20 places the preform 2 on the lower mold 11 (or the portion corresponding to the cavity 9 in the lower mold 11) under the control of the control device 90. At this time, the shaft 25 supports the preform 2. Thereafter, the mold driving mechanism 30 starts mold clamping in a state where the cutting core 17 is located in a low position and temporarily tightens the upper mold 12 under the control of the control device 90. Temporary tightening is an intermediate state between the state where the upper mold 12 is open and the fully tightening state, and the lower mold 11 and the upper mold 12 has a gap therebetween in the temporary tightening state. As shown in FIG. 4, the upper mold 12 moves to a position having a gap (second gap) of several mm with the preform 2. This gap (second gap) between the upper mold 12 and the preform 2 is larger than a gap (first gap) between the lower mold 11 and the preform 2.

(Vacuum Degassing Step: S205)

Next, the control device 90 controls the vacuum pump 50 while keeping the above-mentioned temporary tightening state (i.e., before completion of mold clamping) to degas the mold 10 (FIG. 4).

(Resin Pouring Step: S206)

After stopping (or completion of) the above-stated vacuum degassing, the resin 3 is injected/poured into the mold 10 (FIG. 5). Specifically, the control device 90 opens the valve 65, pressurizes the base resin stored in the resin reservoir 62 with the pressure device 63, and pressurizes the curing agent stored in the resin reservoir 67 with the pressure device 68 to mix the base resin and the curing agent and prepare (uncured) resin 3. This lets the (uncured) resin 3 flow through the resin pouring pipe 16 that extends from the upper mold 12 to the lower mold 11, so that the resin 3 is injected/poured toward the preform 2 from the gates (in the illustrated example, the three gates at the central portion and the opposite end portions of the preform 2) 14 through the main runner 16a and the runners 16b. Since the upper mold 12 is temporarily tightened, the resin 3 is injected and poured mainly into the gap (second gap) between the upper mold 12 and the (upper face of) preform 2.

(Fully Tightening Step: S207)

Figure 6:
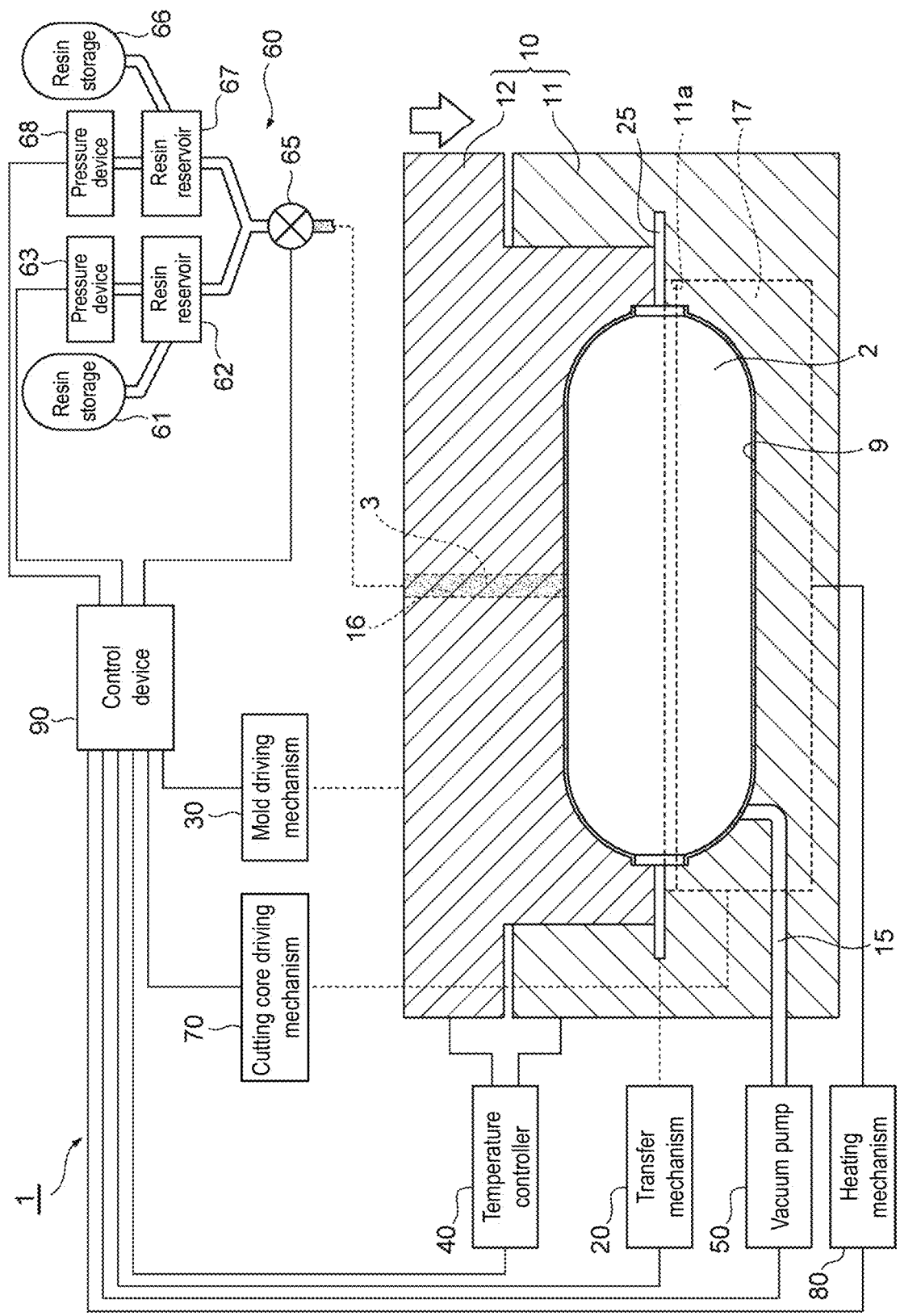
FIG. 6 is a vertical cross-sectional view of the manufacturing device of a high-pressure tank, showing a fully tightening step according to the embodiment.

Next, the control device 90 controls the mold driving mechanism 30 to lower the upper mold 12 to the lower end to completely close the mold (i.e., bring it closer to the preform 2) and completely close (fully tightening) the upper mold 12 and the lower mold 11 (FIG. 6). This keeps compressive filling with the resin 3 in the mold 10 uniform, and allows impregnation with the resin 3 in the lamination of the fiber layer of the preform 2.

(Resin-Pouring Stop and Cutting Core High-Temperature Heating Step: S208)

Figure 7:
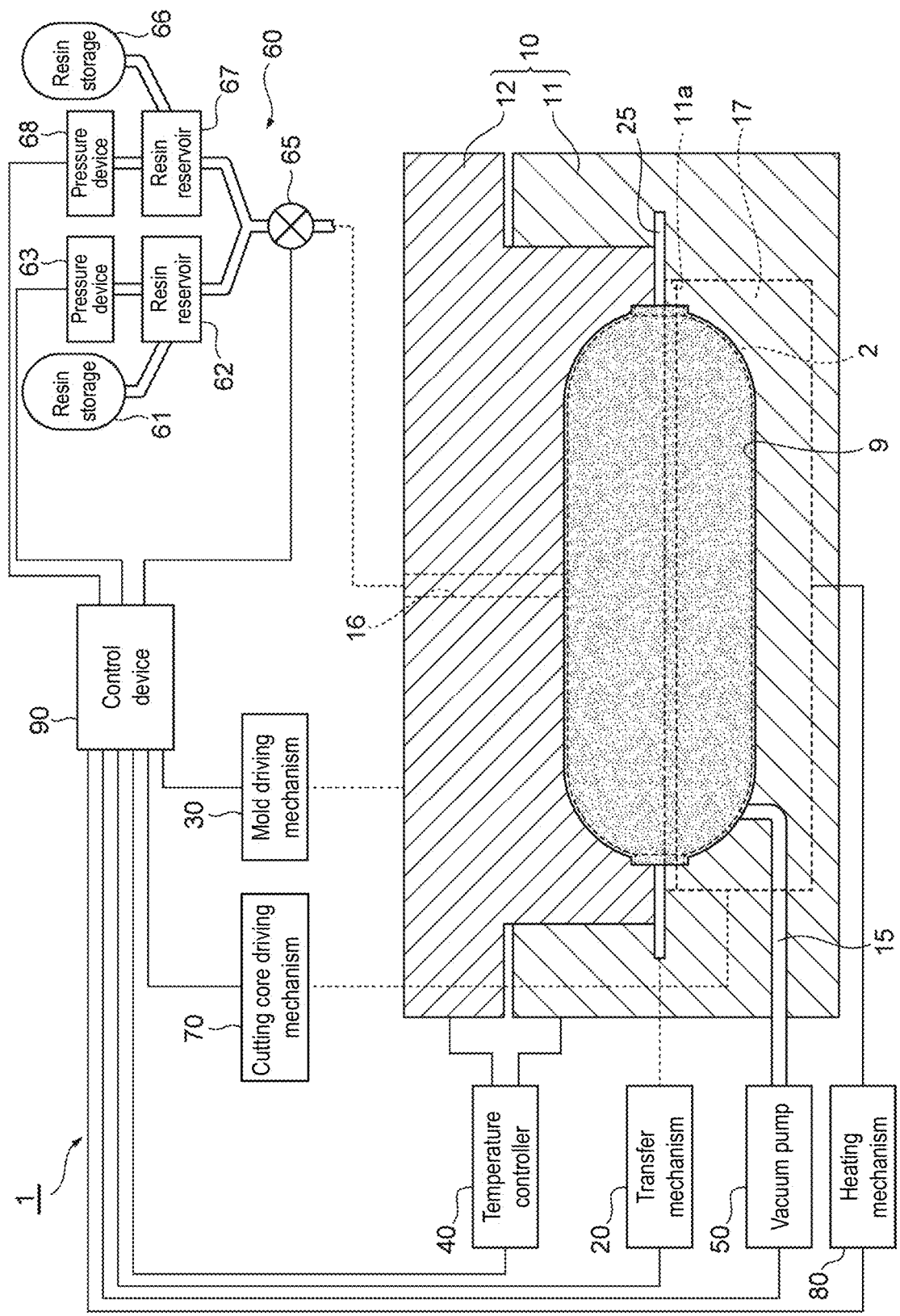
FIG. 7 is a vertical cross-sectional view of the manufacturing device of a high-pressure tank, showing a resin-pouring stop and cutting core high-temperature heating step according to the embodiment.

Then, after the fiber layer is completely impregnated with the resin 3, the method stops the pouring of the resin 3 into the mold 10 (into the cavity 9) and cures the resin 3 (FIG. 7). At the same time, the control device 90 controls the heating mechanism 80 to start high-temperature heating of only the cutting core 17. Herein, the cutting core 17 is heated from the temperature of the mold 10 (for example, about 80° C. to 100° C.) to a higher temperature (for example, about 120° C. to 140° C.) than the mold 10. This accelerates and facilitates the curing of the portion of the resin 3 in the runners 16b in the position of the cutting core 17. In addition, the high-temperature heating of only the cutting core 17 having a relatively smaller volume than the mold 10 can effectively (that is, in a short time) cure the portion of the resin 3 in the runners 16b in the position of the cutting core 17.

(Cutting Core Raising Step: S209)

Figure 8:
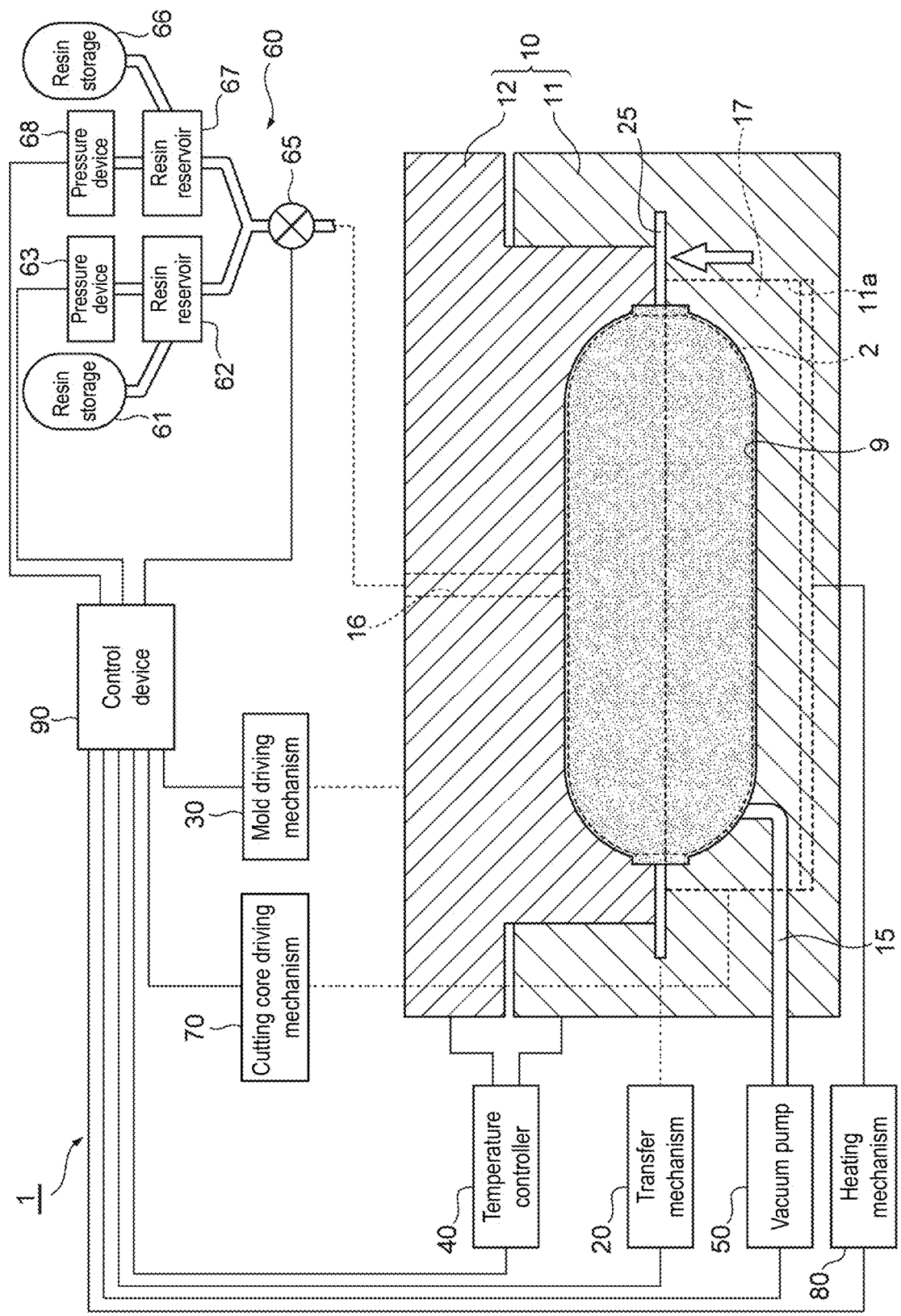
FIG. 8 is a vertical cross-sectional view of the manufacturing device of a high-pressure tank, showing a cutting core raising step according to the embodiment.

At a timing when the portion of the resin 3 in the runners 16b in the position of the cutting core 17 (hereinafter the portion may be called the portion of the resin 3 other than the product) comes to a semi-cured state by the high-temperature heating of the cutting core 17, the control device 90 controls the cutting core driving mechanism 70 to raise the cutting core 17 and cut the portion of the resin 3 other than the product (FIG. 8). The timing when the portion of the resin 3 other than the product comes to a semi-cured state may be determined as a timing set beforehand from, for example, the relation between the curing time and the viscosity of the resin 3 shown in FIG. 10. In the "semi-cured state," the viscosity of the resin 3 is within a predetermined range, and the term "semi-cured state" as used in the present embodiment refers to a state from the time when the viscosity starts to temporarily decrease after the beginning of the curing with an increasing viscosity, to the time when the viscosity reaches about 90% of the maximum viscosity by the completion of the curing. Herein, while retaining the temperature of the cutting core 17 (for example, about 120° C. to 140° C.), the resin 3 may be cut with the cutting core 17.

(Resin Curing Step: S210)

Figure 9:
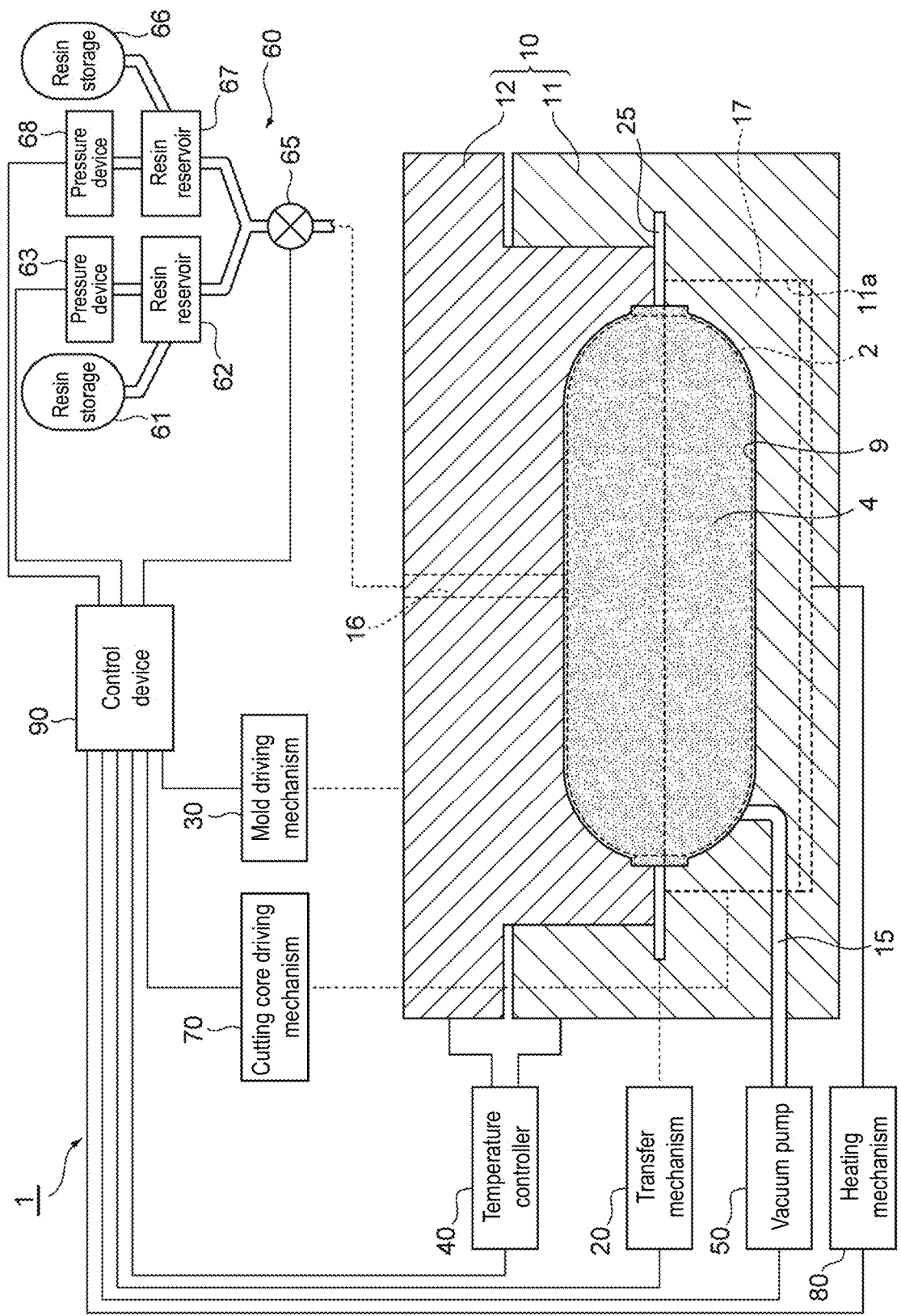
FIG. 9 is a vertical cross-sectional view of the manufacturing device of a high-pressure tank, showing a resin curing step according to the embodiment.
Figure 10:
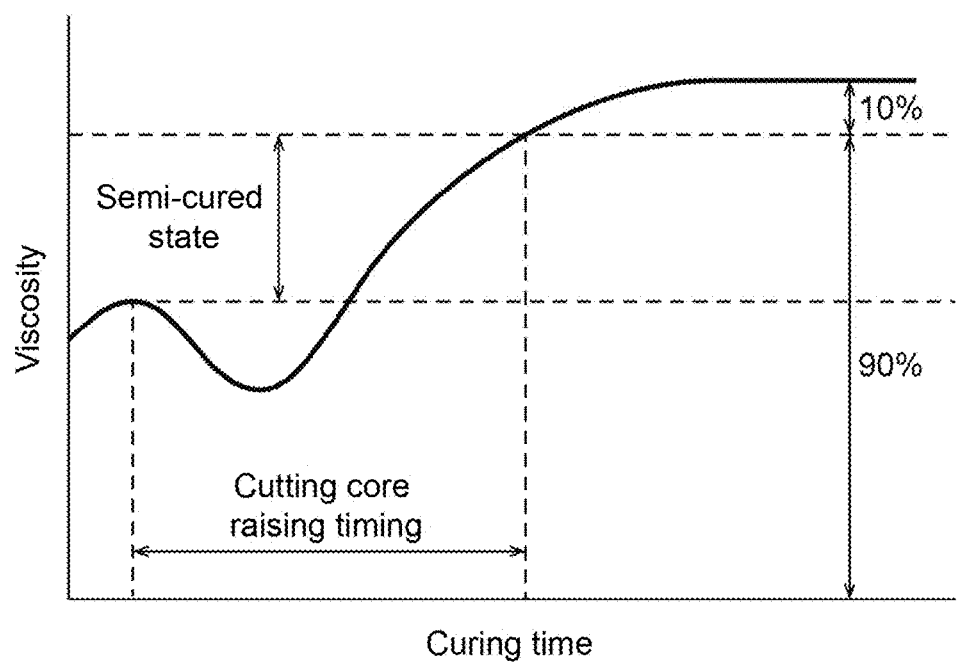
FIG. 10 is a schematic diagram showing the relation between a curing time and a viscosity of resin (epoxy resin)

After the cutting with the above-described cutting core 17, the method cures the resin 3 in the mold 10 (in the cavity 9) (specifically, the resin 3 impregnated into the preform 2 in the cavity 9) (FIG. 9). Herein, the hardness (viscosity) of the resin 3 is set to allow demolding.

(Demolding Step: S211)

After the curing of the resin 3 ends, the control device 90 controls the mold driving mechanism 30 to open the mold 10 (the upper mold 12) to remove the molded high-pressure tank 4 (the preform 2 after the resin 3 is impregnated and cured) from the mold 10. In the present embodiment, when opening the upper mold 12, the portion of the resin 3 other than the product is completely cut off (sheared) (see FIG. 11). When the curing of the resin 3 ends, the high-pressure tank 4 having the fiber reinforced resin layer formed on the outer periphery of the liner is obtained.

(Aftercare step: S212)

Next, the control device 90 controls the transfer mechanism 20 to deliver the molded high-pressure tank 4 removed from the mold 10 to a curing furnace (not illustrated) to perform an aftercure step. The aftercure step heats the high-pressure tank 4 at a higher temperature (for example, about 140° C. to 160° C.) than the temperature of the mold 10 (for example, about 80° C. to 100° C.). This increases intermolecular bonds (accelerates reaction) in the resin 3 of the high-pressure tank 4 and cures (completely cures) the resin 3 of the high-pressure tank 4 until it has stable properties as a product.

It should be noted that the heating temperature in the aftercure step is higher than the heating temperature of the cutting core 17. In other words, the above-mentioned heating temperature of the cutting core 17 (for example, about 120° C. to 140° C.) is higher than the temperature of the mold 10 (for example, about 80° C. to 100° C.) and lower than the heating temperature in the aftercure step (for example, about 140° C. to 160° C.). For example, if the heating temperature of the cutting core 17 is too high (i.e., higher than or equal to the curing temperature), the resin 3 partly starts to be cured, leading to variations in the cured state in the subsequent resin curing step (S210). In other words, by setting the heating temperature of the cutting core 17 to such a high temperature that makes the resin 3 almost completely cured as compared to the tank portion, it is possible to clearly cut the resin 3 (if the cutting surface is not clear, the strength decreases from the cutting surface). However, if the resin 3 is completely cured by setting the heating temperature of the cutting core 17 to a much higher temperature, the resin 3 will not be integrated with the tank portion (the portion of the resin 3 becomes foreign matter, and thus the strength decreases from the portion).

As described above, when the RTM method manufactures a high-pressure tank for fuel cell vehicles, after the impregnation of epoxy resin and the curing of the epoxy resin in the mold, the portions of the resin other than the product such as a runner, a gate, etc. are cut and subjected to the post-processing. At this time, variation in the time and tank temperature before the subsequent aftercure step may cause critical quality problems leading to the deterioration of the tank performance.

In order to control and stabilize the curing condition (time and temperature) in the RTM method and to integrate the steps by performing the post-processing in the RTM mold, the present embodiment disposes, in the mold, the cutting core 17 as a movable core to cut the portion other than the tank product during the resin impregnation in the RTM step and the heating mechanism 80 for the cutting core, and cuts the portion of the resin to be cut while rapidly curing it in the mold, thereby removing the portion of the resin other than the product in the RTM resin impregnation step.

After setting the tank (preform 2) in the mold 10 and mold clamping and then pouring the resin 3, the present embodiment impregnates the tank (the fiber layer of the preform 2) with the resin 3, and cures the resin 3. At a timing when the curing of the resin 3 starts, the present embodiment starts high-temperature heating of the cutting core 17 in the portion to be cut and facilitates the curing of the portion of the resin 3 to be cut other than the product. At a timing when only the portion of the resin 3 to be cut is semi-cured, the present embodiment raises the heated cutting core 17 and cuts the portion of the resin 3 to be cut in the mold. Then, after the curing of the resin 3 ends and the tank is removed, the present embodiment continuously transfers only the tank to the aftercure step, thereby manufacturing a high-pressure tank. Since the time and temperature will not change before the aftercure step after the impregnation of epoxy resin and the curing of the epoxy resin in the mold, the present embodiment can manufacture a high-pressure tank with a stable curing reaction.

It should be noted that since the present embodiment will not heat the entire mold at a high temperature, epoxy resin impregnation will not be reduced by an increase in the viscosity along with the heating, and the present embodiment can cut the portion of the resin 3 to be cut other than the tank product in the RTM mold, allowing continuous production of tank products.

In this way, when a thick tank is formed by the RTM impregnation technology, the present embodiment cuts the portion of the resin 3 to be cut other than the tank product in the mold. This configuration can control and stabilize the curing reaction and also allows continuous production of tank products by integrating the steps in the post-processing. Thus, the present embodiment can manufacture a high-pressure tank 4 that achieves the improvement of resin impregnation, quality, and tank performance and the cost reduction at the same time.

As described above, according to the present embodiment, with use of the cutting core 17 that is heated to a higher temperature than the mold 10, the curing of the portion of the resin (thermosetting resin) 3 to be cut in the runners 16*b* is facilitated, and the portion of the resin 3 in the runners 16*b* to be cut is cut by the cutting core 17. This configuration can perform gate cut without producing foreign matter and also make the resin 3 stably cured, thus increasing the strength of the high-pressure tank (fiber reinforced resin molded article) 4.

In addition, the aftercure step can increase the strength of the high-pressure tank (fiber reinforced resin molded article) 4, and the performing of the gate cut in the mold 10 can suppress the temperature change in the product before the aftercure, thus effectively increasing the strength and quality of the high-pressure tank (fiber reinforced resin molded article) 4.

Furthermore, by setting the temperature of the cutting core 17 within a predetermined range, the present embodiment can obtain an excellent cutting surface in the portion of the resin 3 to be cut in the runners 16*b*, thus effectively increasing the strength of the high-pressure tank (fiber reinforced resin molded article) 4.

That is a detailed description of the embodiment of the present disclosure referring to the drawings. The specific configuration of the present disclosure is not limited to the above-stated embodiment, and the design may be modified variously without departing from the spirits of the present disclosure. The present disclosure covers such modified embodiments.

DESCRIPTION OF SYMBOLS

1 Manufacturing device of high-pressure tank (fiber reinforced resin molded article)
2 Preform
3 Resin
4 High-pressure tank (fiber reinforced resin molded article)
9 Cavity
10 Mold
11 Lower mold (first mold)
11*a* Fitting groove
11*b* Insertion hole
12 Upper mold (second mold)
14 Gate
15 Vacuum degassing pipe (vacuum degassing mechanism)
16 Resin pouring pipe (resin pouring mechanism)
16*a* Main runner (resin pouring mechanism)
16*b* Runner (resin pouring mechanism)
17 Cutting core
19 Pressing pin (pressing member)
20 Transfer mechanism
25 Shaft
30 Mold driving mechanism
40 Temperature controller
50 Vacuum pump (vacuum degassing mechanism)
60 Resin injector (resin pouring mechanism)
61, 66 Resin storage
62, 67 Resin reservoir
63, 68 Pressure device
65 Valve
70 Cutting core driving mechanism
80 Heating mechanism
90 Control device

What is claimed is:

1. A method for manufacturing a fiber reinforced resin molded article, the method comprising:
    preparing a mold having a runner for pouring resin into a cavity, the resin including a thermosetting resin, wherein a cutting core is disposed in the mold, the cutting core being movable relative to the runner to cut the resin in the runner;
    placing a preform in the cavity, the preform including a fiber layer on an outer surface of a liner;
    pouring the resin into the cavity through the runner;
    stopping pouring of the resin into the cavity, curing the resin, and heating the cutting core to a higher temperature than the mold;
    cutting the resin in the runner by moving the cutting core relative to the runner when a viscosity of a portion of the resin in the runner in a position of the cutting core is within a predetermined range; and
    demolding the preform while opening the mold after the curing of the resin impregnated into the preform ends;
    wherein
    the fiber layer of the preform becomes impregnated with the resin,
    in the cutting, part of the resin in the runner is cut by the cutting core, and
    in the demolding, when opening the mold, a shear is produced between a portion of the resin in the runner close to the cavity with respect to the cutting core and a portion of the resin in the runner opposite to the cavity with respect to the cutting core, and a remaining part of the resin in the runner is cut.

2. The method for manufacturing a fiber reinforced resin molded article according to claim 1, wherein the method comprises determining a relation between a curing time and a viscosity of the resin, and determining whether the viscosity of the portion of the resin in the runner in the position of the cutting core is within the predetermined range.

3. The method for manufacturing a fiber reinforced resin molded article according to claim 1, further comprising, after the demolding, an aftercure in which the preform is heated at a higher temperature than a temperature of the mold.

4. The method for manufacturing a fiber reinforced resin molded article according to claim 3, wherein a heating temperature of the cutting core is higher than the temperature of the mold and lower than a heating temperature in the aftercure.

5. The method for manufacturing a fiber reinforced resin molded article according to claim 1,
    wherein:
    the mold includes a first mold and a second mold; and
    in the placing the preform in the cavity, the preform is placed between the first mold and the second mold so as to define a first gap between the first mold and the preform and a second gap between the second mold and the preform, the second gap being larger than the first gap,
    the method further comprising
    in the pouring resin into the cavity through the runner, bringing the second mold close to the preform for compressive filling with the resin in the cavity.

* * * * *